US012686002B2

(12) United States Patent
Kim et al.

(10) Patent No.: US 12,686,002 B2
(45) Date of Patent: Jul. 21, 2026

(54) METHOD FOR RECOVERING AND REUSING SELECTIVE HOMOGENEOUS HYDROGENATION CATALYST

(71) Applicant: HANWHA SOLUTIONS CORPORATION, Seoul (KR)

(72) Inventors: Youngjin Kim, Daejeon (KR); Jinho Park, Daejeon (KR); Namjin Jang, Daejeon (KR)

(73) Assignee: HANWHA SOLUTIONS CORPORATION, Seoul (KR)

(*) Notice: Subject to any disclaimer, the term of this patent is extended or adjusted under 35 U.S.C. 154(b) by 552 days.

(21) Appl. No.: 18/256,648

(22) PCT Filed: Dec. 10, 2021

(86) PCT No.: PCT/KR2021/018789
§ 371 (c)(1),
(2) Date: Jun. 9, 2023

(87) PCT Pub. No.: WO2022/124863
PCT Pub. Date: Jun. 16, 2022

(65) Prior Publication Data
US 2024/0033721 A1     Feb. 1, 2024

(30) Foreign Application Priority Data
Dec. 11, 2020    (KR) ......................... 10-2020-0173362

(51) Int. Cl.
*B01J 38/00*      (2006.01)
*C07C 5/05*       (2006.01)

(52) U.S. Cl.
CPC ..................................... *B01J 38/00* (2013.01)

(58) Field of Classification Search
None
See application file for complete search history.

(56) References Cited

U.S. PATENT DOCUMENTS

2008/0275276 A1* 11/2008 Teles ....................... C07C 45/28
                                                        568/363
2019/0232271 A1     8/2019 Meier

FOREIGN PATENT DOCUMENTS

| JP | 2007-506694 A | 3/2007 |
|----|---------------|--------|
| JP | 2007-506695 A | 3/2007 |
| JP | 2019-523121 A | 8/2019 |
| KR | 10-2019-0058075 A | 5/2019 |
| KR | 10-2020-0076301 A | 6/2020 |

OTHER PUBLICATIONS

Internation Search Report Dated Mar. 23, 20222.

* cited by examiner

*Primary Examiner* — Ali Z Fadhel
(74) *Attorney, Agent, or Firm* — Harvest IP Law, LLP

(57)          ABSTRACT

The present invention relates to a method for recovering and reusing a selective homogeneous hydrogenation catalyst. The present invention relates to a method for recovering a selective homogeneous hydrogenation catalyst from a second reaction resolution in which a synthesis of cyclododecene is completed after synthesizing the cyclododecene by selective hydrogenation of a first reaction solution containing cyclododecatriene, triphenylphosphine, formaldehyde, and ruthenium chloride, and the method includes: preparing the selective homogeneous hydrogenation catalyst from the triphenylphosphine, the formaldehyde, and the ruthenium chloride during the selective hydrogenation of the first reaction solution, and synthesizing the cyclododecene; mixing a solvent containing cyclododecanone with the first reaction solution; and recovering the selective homogeneous hydrogenation catalyst through evaporation separation from the second reaction solution in which the synthesis of the cyclododecene is completed.

9 Claims, No Drawings

METHOD FOR RECOVERING AND REUSING SELECTIVE HOMOGENEOUS HYDROGENATION CATALYST

CROSS-REFERENCE TO RELATED APPLICATION(S)

This application is a National Stage of International Application No. PCT/KR2021/018789 filed on Dec. 10, 2021, claiming priority based on Korean Patent Application No. 10-2020-0173362 filed on Dec. 11, 2020, the disclosure of which is incorporated herein by reference in its entirety.

TECHNICAL FIELD

The present invention relates to a method for recovering and reusing a selective homogeneous hydrogenation catalyst.

BACKGROUND ART

A synthesis of cyclododecene (CDEN) by selective hydrogenation reaction using cyclododecatriene (CDT) as a starting material is often described in the literature, and many studies are being conducted to improve a yield of cyclododecene.

For the selective hydrogenation reaction, a metal ligand catalyst known as a Wilkinson catalyst, that is, a catalyst in which ligands, such as triphenylphosphine (TPP) and CO, and halogen elements are bonded to metals such as rubidium (Ru), rhodium (Rh), cobalt (Co), and nickel (Ni) has been used.

The catalyst is a material that is indispensable in the chemical industry as a substance that activates the entire reaction to occur quickly without reacting by itself in a certain reaction system. The catalyst usually performs its role while being present in a small amount in the reaction system. As the chemical industry develops, the amount of catalyst used increases, and wastes from spent catalysts are also rapidly increasing. In Korea, which has no natural resources and relies entirely on imports for industrial raw materials related to precious metals, there is an urgent need to recover precious metals from waste catalysts and reuse the precious metals as the industrial raw materials.

A method for recovering a catalyst after a selective hydrogenation reaction has been known depending on the state and conditions of the catalyst.

For example, U.S. Pat. No. 4,413,118 discloses a technique for interacting a catalyst, in which triphenylphosphine and a halogen element are bonded to a Group 8 metal with a ligand, with a material containing a C=S bond and separating the catalyst. However, there is a disadvantage in that the interaction process takes a lot of time and cooling should be performed to about 0° C.

U.S. Pat. No. 3,715,405 discloses that, when a $[Co(CO)_3P(n\text{-}C_4H_9)_3]_2$ catalyst is used in a selective hydrogenation reaction to produce cyclododecene from cyclododecatriene, the catalyst can be recovered through phase separation without a separate separation technology after the reaction. However, there is a disadvantage in that process efficiency is not good as the amount of catalyst required is large and an elaborate and complicated separation process should be performed to completely remove a solvent after phase separation. In order to solve the problems of the related art, Korean Patent Laid-open Publication No. 10-2020-0076301 previously filed by the applicant confirmed that a product and a catalyst are separated through a distillation device and the recovered catalyst can be reused, but has a disadvantage in that a volume ratio of the catalyst is low, and thus, it is difficult to maintain the operation of the evaporation separation device and as the product, cyclododecene (CDEN), remains and is reused, a production rate of cyclododecane (CDAN), which is a by-product, increases. In addition, there is a difficulty in maintaining a temperature of 80° C. or higher continuously to maintain high flowability.

Accordingly, the present inventors have intensified research on an efficient method for recovering and reusing a selective hydrogenation catalyst. As a result, the present invention was completed by confirming that a selective hydrogenation catalyst may be separated and recovered through a simple method using an appropriate solvent, a design and operation maintenance of an evaporation separation device are easy, and both a conversion rate of cyclododecatriene and selectivity of cyclododecene may be maintained at a high level even when a solvent is added.

DISCLOSURE

Technical Problem

An object of the present invention provides a method for recovering and reusing a selective homogeneous hydrogenation catalyst capable of separating and recovering a selective homogeneous hydrogenation catalyst through a relatively simple method in a short process time, facilitating a design and operation maintenance of a evaporation separation device, and maintaining a conversion rate of cyclododecatriene and selectivity of cyclododecene at a high level.

Technical Solution

In one general aspect, a method for recovering a selective homogeneous hydrogenation catalyst from a second reaction resolution in which a synthesis of cyclododecene is completed after synthesizing the cyclododecene by selective hydrogenation of a first reaction solution containing cyclododecatriene, triphenylphosphine, formaldehyde, and ruthenium chloride includes: preparing the selective homogeneous hydrogenation catalyst from the triphenylphosphine, the formaldehyde, and the ruthenium chloride during the selective hydrogenation of the first reaction solution, and synthesizing the cyclododecene; mixing a solvent containing cyclododecanone with the first reaction solution; and recovering the selective homogeneous hydrogenation catalyst through evaporation separation from the second reaction solution in which the synthesis of the cyclododecene is completed.

The solvent may be the cyclododecanone dissolved in the cyclododecatriene.

The evaporation separation may be performed through a distillation column, the distillation column may be provided with an upper column through which a product containing the cyclododecene is discharged, and a lower column through which the selective homogeneous hydrogenation catalyst and the solvent are separated, and a pressure of the upper column may be 0.1 bar or less and a temperature thereof may be 100° C. to 200° C., and a pressure of the lower column may be 0.1 bar or less and the temperature thereof may be 150° C. to 250° C., during the evaporation separation.

A molar ratio of the ruthenium chloride:the triphenylphosphine:the formaldehyde may be 1:100 to 300:150 to 500.

The selective hydrogenation may be performed in a stirred tank reactor provided with a gas-induced hollow stirrer.

Hydrogen gas present in a gas phase at an upper end of the stirred tank reactor may be supplied to the reaction solution through a hollow of the gas-induced hollow stirrer.

The first reaction solution may further include a catalyst activator containing acetic acid.

The catalyst activator may be added in an amount of 0.01 to 2 parts by weight based on 100 parts by weight of the cyclododecatriene.

The selective hydrogenation may be performed under conditions of a temperature of 100 to 200° C. and a pressure of 10 to 80 bar.

In another general aspect, a method for reusing a recovered selective homogeneous hydrogenation catalyst includes: re-introducing the selective homogeneous hydrogenation catalyst recovered by the above-described method into a third reaction solution containing the cyclododecatriene and performing secondary selective hydrogenation to synthesize the cyclododecene.

Advantageous Effects

According to a method for recovering and reusing a selective homogeneous hydrogenation catalyst according to the present invention, it is possible to separate unreacted cyclododecatriene and cyclododecadiene, cyclododecene as a product, a selective homogeneous hydrogenation catalyst, and excess triphenylphosphine only by a method for adding a solvent containing cyclododecanone (CDON) to a reactant and then separating the solvent by evaporation, and to use the separated and recovered selective homogeneous hydrogenation catalyst and excess triphenylphosphine in a next selective hydrogenation reaction without separate post-treatment.

In addition, as a solvent containing cyclododecanone (CDON), which is an intermediate product of a laurolactam preparing process, is used, the quality of the product is not affected even if the cyclododecanone is included in the product. As a result, there is no need to perform an elaborate and complicated process to completely separate the product and the solvent, and since the catalyst containing the cyclododecanone as the solvent can be directly introduced into the process, it is possible to efficiently recover and reuse the catalyst.

In addition, it is possible to maintain both a conversion rate of cyclododecatriene and selectivity of cyclododecene at a high level when a recovered selective homogeneous hydrogenation catalyst is reused.

Even if it is an effect not explicitly mentioned herein, the effects described in the following specification expected by the technical features of the present invention and their potential effects are treated as if they were described in the specification of the present invention.

BEST MODE

Hereinafter, a method for recovering and reusing a selective homogeneous hydrogenation catalyst according to the present invention will be described in detail. Technical terms and scientific terms used in the present specification have the general meaning understood by those skilled in the art to which the present invention pertains unless otherwise defined, and a description for the known function and configuration unnecessarily obscuring the gist of the present invention will be omitted in the following description.

In addition, the terms first, second, A, B, (a), (b), and the like may be used in describing components of the present invention. These terms are used only in order to distinguish any component from other components, and features, sequences, or the like, of corresponding components are not limited by these terms.

In addition, a singular form of a term used herein may be construed to include a plural form as well unless otherwise indicated.

Unless specifically stated herein, the unit of % used means % by weight unless otherwise specified.

As a catalyst used in a selective hydrogenation reaction to produce cyclododecene from cyclododecatriene, rare and expensive precious metals are used due to low production. As a result, in Korea, which relies entirely on imports for industrial raw materials related to precious metals, it is urgent to recover precious metals from waste catalysts and reuse the recovered precious metals as industrial raw materials. In order to solve the problems of the related art, Korean Patent Laid-open Publication No. 10-2020-0076301 previously filed by the applicant confirmed that a product and a catalyst are separated through a distillation device and the recovered catalyst can be reused, but has a disadvantage in that a volume ratio of the catalyst is low, and thus, it is difficult to maintain the operation of the evaporation separation device and as the product, cyclododecene (CDEN), remains and is reused, a production rate of cyclododecane (CDAN), which is a by-product, increases. In addition, there is a difficulty in maintaining a temperature of 80° C. or higher continuously to maintain high flowability.

Therefore, the present inventors may facilitate the design and operation maintenance of the evaporation separation device while easily separating and recovering the selective homogeneous hydrogenation catalyst by additionally using an appropriate solvent for a catalyst. In addition, when the recovered selective homogeneous hydrogenation catalyst is reused, it is intended to provide a method for recovering and reusing a selective homogeneous hydrogenation catalyst capable of maintaining both a conversion rate of cyclododecatriene and selectivity of the cyclododecene at a high level.

In detail, the method for recovering a selective homogeneous hydrogenation catalyst according to the present invention is a method for recovering a selective homogeneous hydrogenation catalyst from a second reaction resolution in which a synthesis of cyclododecene is completed after synthesizing the cyclododecene (CDEN) by selective hydrogenation of a first reaction solution containing cyclododecatriene (CDT), triphenylphosphine (TPP), formaldehyde, and ruthenium chloride ($RhCl_3$), and the method includes preparing the selective homogeneous hydrogenation catalyst from the triphenylphosphine, the formaldehyde, and the ruthenium chloride during the selective hydrogenation of the first reaction solution, and synthesizing the cyclododecene; mixing a solvent containing cyclododecanone (CDON) with the first reaction solution; and recovering the selective homogeneous hydrogenation catalyst through evaporation separation from the second reaction solution in which the synthesis of the cyclododecene is completed.

As such, only an evaporation separation method may separate unreacted cyclododecatriene and cyclododecadiene, cyclododecene as a product, a selective homogeneous hydrogenation catalyst, and excess triphenylphosphine, and the separated and recovered selective homogeneous hydrogenation catalyst and excess triphenylphosphine may be used as they are in the next selective hydrogenation reaction without separate post-treatment.

In addition, as a solvent containing cyclododecanone (CDON), which is an intermediate product of a laurolactam preparing process, is used for a catalyst, the quality of the product is not affected even if the cyclododecanone is contained in the product. As a result, there is no need to perform an elaborate and complicated process to completely separate the product and the solvent, and as the catalyst containing the cyclododecanone as the solvent may be directly introduced into the process, it is possible to efficiently recover and reuse the catalyst.

In addition, rather than causing the selective hydrogenation by forming the selective homogeneous hydrogenation catalyst during the reaction initially using the catalyst containing triphenylphosphine, formaldehyde, and ruthenium chloride, an induction period may be reduced when using the recovered selective homogeneous hydrogenation catalyst, thereby further increasing productivity.

In addition, it is possible to maintain both a conversion rate of cyclododecatriene and selectivity of cyclododecene at a high level when a recovered selective homogeneous hydrogenation catalyst is reused.

Hereinafter, the method for recovering a selective homogeneous hydrogenation catalyst according to the present invention will be described in detail.

First, as the step of synthesizing the cyclododecene by the selective hydrogenation of the first reaction solution containing the cyclododecatriene, the triphenylphosphine, the formaldehyde, and the ruthenium chloride, a step of synthesizing cyclododecene by preparing a selective homogeneous hydrogenation catalyst from the triphenylphosphine, the formaldehyde, and the ruthenium chloride during the selective hydrogenation may be performed. In this case, of course, hydrogen gas ($H_2$) is introduced through the conventional method for selective hydrogenation.

This step is a step of synthesizing the cyclododecene, and the cyclododecene may be synthesized through a method to be described later or the existing known method.

Specifically, in the step of synthesizing the cyclododecene, the selective hydrogenation may be performed in a stirred tank reactor provided with a gas-induced hollow stirrer. As such, when the reaction is performed by adopting a mean using a gas-induced hollow stirrer, reactivity may be secured without an organic solvent normally used to increase reactivity, and at the same time, a reaction time may be remarkably reduced.

More specifically, in the step of synthesizing the cyclododecene, a reaction is performed by rotating and stirring a gas-induced hollow stirrer, and hydrogen gas present in a gas phase at an upper end of a stirred tank reactor through a hollow of the gas-induced hollow stirrer may be supplied to the reaction solution, and thus, hydrogen may be supplied to the cyclododecariene. The gas-induced hollow stirrer has a hollow passage formed therein, and the hydrogen gas is introduced through the hollow passage and contacts the cyclododecatriene, so the selective hydrogenation may be performed.

Alternatively, the cyclododecene may be synthesized through the existing known method.

On the other hand, during the selective hydrogenation, the selective homogeneous hydrogenation catalyst may be prepared from the triphenylphosphine, the formaldehyde, and the ruthenium chloride to synthesize the cyclododecene, and a homogeneous complex catalyst, which is the selective homogeneous hydrogenation catalyst, may be $RuH(PPh_3)_3$ (CO)Cl or $Ru(PPh_3)_2$ $(CO)_2Cl_2$, or both.

Specifically, the triphenylphosphine and the formaldehyde are materials that form a complex on the ruthenium chloride to act as the catalyst for the selective hydrogenation.

As a preferred example, the molar ratio of the ruthenium chloride:the triphenylphosphine:the formaldehyde may be 1:100 to 300:150 to 500, more preferably, the molar ratio of the ruthenium chloride:the triphenylphosphine:the formaldehyde may be 1:130 to 250:200 to 400, and even more preferably, the molar ratio of the ruthenium chloride:the triphenylphosphine:the formaldehyde may be 1:170 to 230: 250 to 350. The conversion rate and selectivity may be remarkably improved in the above range. However, this is only a preferred example, and the present invention is not limited thereto.

Also, in one example of the present invention, the first reaction solution may further include a catalyst activator containing acetic acid. When the acetic acid is introduced, the reaction of the ruthenium chloride-triphenylphosphine complex catalyst may be further activated to further improve the conversion rate and selectivity. As a preferred example, the acetic acid may be added in 0.01 to 2 parts by weight based on 100 parts by weight of cyclododecatriene, preferably 0.05 to 1.5 parts by weight based on 100 parts by weight of cyclododecatriene, and more preferably 0.1 to 1 parts by weight based on 100 parts by weight of cyclododecatriene. However, this is only a preferred example, and the present invention is not limited thereto.

In one example of the present invention, the amount of catalyst used containing triphenylphosphine, formaldehyde and ruthenium chloride is not limited as long as the reaction of the reactants may sufficiently proceed. The catalyst containing the triphenylphosphine, the formaldehyde, and the ruthenium chloride may be added in preferably 1 to 20 parts by weight based on 100 parts by weight of the cyclododecatriene, and the catalyst containing the triphenylphosphine, the formaldehyde, and the ruthenium chloride may be added in preferably 1 to 10 parts by weight and more preferably 1 to 7 parts by weight. However, this is only a preferred example for improving the conversion rate and selectivity, and the present invention is not limited thereto.

In one example of the present invention, the selective hydrogenation may be performed under the condition of a temperature of 100 to 200° C. and a pressure of 10 to 80 bar, preferably a temperature of 140 to 180° C. and a pressure of 20 to 60 bar, and more preferably a temperature of 150 to 175° C. and a pressure of 20 to 40 bar, but this is only a preferred example for improving the conversion rate and selectivity, and the present invention is not limited thereto.

Next, the step of mixing the solvent containing the cyclododecanone (CDON) with the first reaction solution may be performed. In this case, the solvent may be added after the selective homogeneous hydrogenation catalyst is formed by the triphenylphosphine, the formaldehyde, and the ruthenium chloride in the first reaction solution, but may be added before the catalyst is formed.

In one embodiment of the present invention, the solvent may be cyclododecanone itself, or may further contain cyclododecatriene. Preferably, the cyclododecanone dissolved in the cyclododecatriene may be used. In this case, the amount of cyclododecanone in the solvent is not limited as long as it can be dissolved in the cyclododecatriene. In addition, as the intermediate product of the laurolactam preparing process, the solvent in which the cyclododecanone (CDON) is dissolved is used for the catalyst, the quality of the product is not affected even if the cyclododecanone is contained in the product. As a result, there is no need to perform an elaborate and complicated process to completely separate the product and the solvent, and as the catalyst containing the solvent cyclododecanone may be directly introduced into the process, it is possible to efficiently recover and reuse the catalyst. In addition, the cyclodeca- triene in which the cyclododecanone is dissolved is a material that participates in this reaction, and does not affect catalyst activity, so there is no problem in reuse even if it remains in the recovered catalyst.

Then, the step of performing the selective hydrogenation of the first reaction solution to separate the second reaction solution, in which the synthesis of the cyclododecene is completed, by evaporation and separate the unreacted cyclododecatriene and cyclododecadiene, and the cyclodo- decene as a product by evaporation and recovering the selective homogeneous hydrogenation catalyst and solvent may be performed.

As described above, only the method of introducing a solvent containing cyclododecanone and then separating the solvent by evaporation may separate unreacted cyclodode- catriene and cyclododecadiene, cyclododecene as a product, a selective homogeneous hydrogenation catalyst, and excess triphenylphosphine, and the separated and recovered selec- tive homogeneous hydrogenation catalyst and excess triph- enylphosphine may be used as they are in the next selective hydrogenation reaction without separate post-treatment.

Furthermore, as the solvent containing the cyclodode- canone of the present invention has good flowability at a melting point of cyclododecanone, which is a relatively low temperature, it is possible to maintain the temperature of the process line lower than in the case of the evaporation separation without adding the solvent, and as a result, it is possible to save energy and more efficiently recover the catalyst.

In one example of the present invention, the evaporation separation may be performed through a distillation column. In this case, the distillation column may be divided into an upper column from which the product containing the cyclo- decene is discharged and a lower column from which the selective homogeneous hydrogenation catalyst and the sol- vent are separated. The evaporation separation may be performed under the condition that the pressure of the upper column is 0.3 bar or less and the temperature thereof is 100 to 200° C., and more preferably, the temperature of the upper column is 130 to 170° C. and the pressure thereof is 0.1 bar or less, but is not limited thereto. The evaporation separation may be performed under the condition that the pressure of the lower column is 0.3 bar or less and the temperature thereof is 150 to 250° C., and more preferably, the pressure of the lower column is 0.1 bar or less and the temperature thereof is 180 to 230° C. Furthermore, a reflux ratio in the distillation column may be 0.5 to 5, and specifically 1 to 2, and a boilup ratio may be 1 to 8, and specifically 4 to 5, but is not limited thereto. However, in the above range, the unreacted cyclododecatriene and cyclododecadiene and the cyclododecene as a product may be effectively separated by evaporation.

In one example of the present invention, the recovery of the selective homogeneous hydrogenation catalyst may be performed at a temperature of 10 to 30° C. and a pressure of 0.1 bar or less or under nitrogen atmosphere conditions. That is, the selective homogeneous hydrogenation catalyst may be recovered by cooling the temperature raised by the evaporation separation process to room temperature.

In addition, the present invention relates to the method for reusing a recovered selective homogeneous hydrogenation catalyst including a step of re-introducing the recovered selective homogeneous hydrogenation catalyst into a third reaction solution containing cyclododecatriene and perform- ing secondary selective hydrogenation to synthesize cyclododecene.

In this case, the method for recovering a selective homo- geneous hydrogenation catalyst is the same as the method for recovering a selective homogeneous hydrogenation cata- lyst described above, and therefore, redundant description thereof will be omitted.

Thereafter, when the evaporation separation and the recovery of the selective homogeneous hydrogenation cata- lyst are completed, the recovered selective homogeneous hydrogenation catalyst is re-introduced into the third reac- tion solution containing the cyclododecatriene and subjected to the secondary selective hydrogenation to synthesize the cyclododecene.

In this case, the secondary selective hydrogenation for synthesizing the cyclododecene may be performed through the existing known method.

As a specific example, the third reaction solution may further include a solvent containing ethanol as well as the cyclododecatriene. As the ethanol has a high dielectric constant, the conversion rate and selectivity may be improved by further activating the reaction of the reactants in the selective hydrogenation. The amount of ethanol used is not limited as long as hydrogen can selectively hydroge- nate cyclododecatriene, and the ethanol may be added in an amount of preferably 1 to 20 parts by weight, more prefer- ably 2 to 15 parts by weight, and more preferably 3 to 10 parts by weight, based on 100 parts by weight of cyclodo- decatriene. However, this is only a preferred example, and the present invention is not limited thereto.

In one example of the present invention, the secondary selective hydrogenation may be performed under the con- dition of a temperature of 120 to 200° C. and a pressure of 10 to 80 bar, preferably a temperature of 140 to 180° C. and a pressure of 20 to 60 bar, and more preferably a temperature of 150 to 175° C. and a pressure of 20 to 40 bar, but this is only a preferred example for improving the conversion rate and selectivity, and the present invention is not limited thereto.

Hereinafter, the method for recovering and using a selec- tive homogeneous hydrogenation catalyst according to the present invention will be described in more detail with reference to Examples. However, the following Inventive Examples are only one reference example for describing the present invention in detail, and the present invention is not limited thereto and may be implemented in various forms.

In addition, unless otherwise defined, all technical and scientific terms have the same meaning as commonly under- stood by one of ordinary skill in the art to which this invention pertains. The terms used in the description herein are for the purpose of effectively describing particular embodiments only and are not intended to limit the invention. In addition, the unit of additives not specifically described in the specification may be wt %.

Example 1

Cyclododecatriene (CDT):ruthenium chloride (RuCl$_3$): triphenylphosphine (TPP):formaldehyde was added at a molar ratio of 7500:1:110:220, and 80 parts by weight of cyclododecanone (CDON) based on 100 parts by weight of cyclododecatriene (CDT) was added. In this case, the mixture was heated to 70° C. under nitrogen conditions to dissolve cyclododecanone (CDON). Thereafter, the reaction solution was stirred at 1600 rpm under the conditions of hydrogen of 6 bar and heated to 140° C. Then, the selective hydrogenation reaction was performed at a temperature of 180° C. under conditions where a hydrogen pressure of 20 bar was maintained. In this case, the reaction was performed in a stirred tank reactor provided with a gas-induced hollow stirrer.

After the selective hydrogenation reaction was performed, the second reaction solution was recovered after cooling to 30° C. or lower under the nitrogen condition.

Then, the second reaction solution was introduced into a distillation column and evaporated. In this case, the internal pressure of the upper column was −0.9 bar and the temperature thereof was 155.9° C., and the internal pressure of the lower column was −0.85 bar and the temperature thereof was 203.5° C. When the evaporation was completed, the selective homogeneous hydrogenation catalyst was recovered by cooling to 30° C. or lower in a nitrogen atmosphere.

Then, the recovered catalyst was re-introduced into the reaction solution to perform the selective hydrogenation reaction again, and then recovered again. In this case, cyclododecatriene (CDT):recovered selective homogeneous hydrogenation catalyst was added at a molar ratio of 7500:1.

Example 2

In the selective homogeneous hydrogenation catalyst recovery method of Example 1, when the selective hydrotriene (CDT) was further added by the amount of cyclododecanone (CDON) added in Example 1 instead of cyclododecanone (CDON).

Experimental Example 1

<Conversion Rate and Selectivity Evaluation>

The reaction time, conversion rate, and selectivity yield of Example 1, Example 2 and Comparative Example were calculated and shown in Table 1 below.

The conversion rate was calculated through Equation 1 below, the selectivity was calculated through Equation 2 below, and the yield was calculated through Calculation Equation 3 below.

$$\text{Conversion rate (\%)} = \quad\quad\quad \text{[Calculation Equation 1]}$$
$$(CDT_0 - CDT_1 - CDDN_1)/CDT_0 \times 100$$

In Equation 1, $CDT_0$ is the number of moles of cyclododecatriene introduced, $CDT_1$ is the number of moles of cyclododecatriene after the reaction, and $CDDN_1$ is the number of moles of cyclododecariene. In this case, the cyclododecadiene (CDDN) is an unfinished hydrogenation product in which only one double bond among three double bonds of cyclododecatriene is hydrogenated and two double bonds remain.

$$\text{Selectivity (\%)} = \quad\quad\quad \text{[Calculation Equation 2]}$$
$$CDEN_1/(CDEN_1 + CDAN_1) \times 100$$

In Calculation Equation 2, $CDEN_1$ is the number of moles of cyclododecene produced, and $CDAN_1$ is the number of moles of cyclododecane as a by-product produced.

$$\text{Yield (\%) = Conversion rate} \times \text{Selectivity} \quad \text{[Calculation Equation 3]}$$

TABLE 1

| Division | Example 1 | | Example 2 | | Comparative Example | |
|---|---|---|---|---|---|---|
| | Primary reaction | Secondary Reaction | Primary reaction | Secondary Reaction | Primary reaction | Secondary Reaction |
| Reaction time (h) | 2.0 | 1.5 | 3.0 | 2.5 | 2.0 | 1.5 |
| Conversion rate (%) | 98.8 | 98.3 | 98.7 | 98.1 | 98.1 | 97.8 |
| Selectivity (%) | 97.6 | 97.4 | 98.1 | 98.3 | 97.6 | 97.8 |
| Yield (%) | 96.4 | 95.7 | 96.8 | 96.4 | 95.7 | 95.6 | genation reaction is performed, the selective homogeneous hydrogenation reaction was recovered and reused in the same manner as in Example 1, except that the selective hydrogenation reaction was performed at a temperature of 170° C. instead of 180° C.

Comparative Example 1

In the selective homogeneous hydrogenation catalyst recovery method of Example 1, the selective homogeneous hydrogenation catalyst was recovered and reused by the recovery method of Example 1, except that cyclododeca- As a result, as shown in Table 1, it was confirmed that the present invention may maintain both the conversion rate of the cyclododecatriene and the selectivity of the cyclododecene at a high level, similar to the comparative example, and the catalyst is recovered in high yield. In addition, according to the present invention, continuous production may be advantageous as it is easy to maintain the operation of the evaporation separation device by preventing the difficulty in maintaining the operation of the evaporation separation device since the volume ratio of the catalyst is low due to the addition of the solvent. In addition, there is no concern that the cyclododecene (CDEN) as the product remains and is reused. Furthermore, in order to maintain high flowability, it is necessary to maintain only a temperature of about 60° C.

or higher, and thus, compared to the comparative example, the process maintenance may be very advantageous.

As described above, although the present invention has been described by specific matters such as detailed components, exemplary embodiments, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to these exemplary embodiments, but the claims and all of modifications equal or equivalent to the claims are intended to fall within the scope and spirit of the present invention.

The invention claimed is:

1. A method for recovering a selective homogeneous hydrogenation catalyst comprising:
   preparing a selective homogeneous hydrogenation catalyst from triphenylphosphine, formaldehyde, and ruthenium chloride in a first reaction solution, and selectively hydrogenating cyclododecatriene to cyclododecene in the first reaction solution;
   in a second reaction mixture, mixing a solvent containing cyclododecanone with the first reaction solution; and
   recovering the selective homogeneous hydrogenation catalyst through evaporation separation from the second reaction solution.

2. The method of claim 1, wherein the evaporation separation is performed through a distillation column,
   the distillation column is provided with an upper column through which a product containing the cyclododecene is discharged, and a lower column through which the selective homogeneous hydrogenation catalyst and the solvent are separated, and a pressure of the upper column is 0.1 bar or less and a temperature thereof is 100° C. to 200° C., and a pressure of the lower column is 0.1 bar or less and the temperature thereof is 150° C. to 250° C., during the evaporation separation.

3. The method of claim 1, wherein a molar ratio of the ruthenium chloride:the triphenylphosphine:the formaldehyde is 1:100 to 300:150 to 500.

4. The method of claim 1, wherein the selective hydrogenation is performed in a stirred tank reactor equipped with a gas-induced hollow stirrer.

5. The method of claim 4, wherein hydrogen gas present in a gas phase at an upper end of the stirred tank reactor is supplied to the reaction solution through a hollow of the gas-induced hollow stirrer.

6. The method of claim 1, wherein the first reaction solution further includes a catalyst activator containing acetic acid.

7. The method of claim 6, wherein the catalyst activator is added in an amount of 0.01 to 2 parts by weight based on 100 parts by weight of the cyclododecatriene.

8. The method of claim 1, wherein the selective hydrogenation is performed under conditions of a temperature of 100 to 200° C. and a pressure of 10 to 80 bar.

9. A method for reusing a recovered selective homogeneous hydrogenation catalyst, comprising:
   re-introducing the selective homogeneous hydrogenation catalyst recovered by the method of claim 1 into a third reaction solution containing the cyclododecatriene and performing secondary selective hydrogenation of the selective homogeneous hydrogenation catalyst to synthesize the cyclododecene.

* * * * *